United States Patent
Grindle et al.

[19]

[11] Patent Number: 5,918,276
[45] Date of Patent: Jun. 29, 1999

[54] WIND SPEED MONITORING SYSTEM

[76] Inventors: Jimmy Grindle, P.O. Box 732; Dale D. Cummings, 5618 Highway 52, both of Dawsonville, Ga. 30534

[21] Appl. No.: 09/055,678

[22] Filed: Apr. 6, 1998

[51] Int. Cl.$^6$ ................................................ G01W 1/00
[52] U.S. Cl. ............................... 73/170.11; 73/170.16
[58] Field of Search ........................ 73/170.03, 170.06, 73/170.07, 170.08, 170.09, 170.11; 340/601; 702/3

[56] References Cited

U.S. PATENT DOCUMENTS

| | | | |
|---|---|---|---|
| 3,777,263 | 12/1973 | Perron et al. | 324/103 P |
| 3,924,465 | 12/1975 | Sem-Sandberg . | |
| 4,201,973 | 5/1980 | Jackson et al. | 73/170.08 |
| 4,413,321 | 11/1983 | Lebrun . | |
| 4,845,629 | 7/1989 | Murga . | |
| 4,937,571 | 6/1990 | Bonafe . | |
| 5,020,730 | 6/1991 | Perroud et al. . | |
| 5,355,724 | 10/1994 | Zysko | 73/170.06 |
| 5,361,633 | 11/1994 | Peet, II | 73/170.08 |

*Primary Examiner*—Ronald L. Biegel
*Attorney, Agent, or Firm*—Chase & Yakimo, L.C.

[57] ABSTRACT

A system for monitoring the wind speed experienced at a particular residential location includes a roof housing with a cup-type anemometer having three or four concave cups attached to a rotatable vertical shaft. The cups resist the wind, causing the cups and shaft to rotate at a rate proportional to the wind speed. Shaft is rotatably joined to a dynamo which converts the mechanical energy derived from rotation of the shaft into electricity. Voltage from the dynamo is then transferred to rechargeable batteries which power the system. An array of solar panels is also utilized to recharge the batteries. The shaft includes a mark detectable by a photomicrosensor through which the shaft extends, allowing the photomicrosensor to count the number of shaft revolutions. This data is sent at fixed time intervals to a logic circuit housed within a display unit. The logic circuit calculates wind speed according to the number of shaft revolutions detected within a fixed time interval. An LED on the display unit corresponding to an appropriate Beufort Scale wind classification is then activated and the wind speed is digitally displayed. An audible alarm within the display unit is activated if the wind speed exceeds a predetermined speed.

14 Claims, 5 Drawing Sheets

WIND SPEED MONITORING SYSTEM

BACKGROUND OF THE INVENTION

This invention relates to an anemometer and, more particularly, to a system for monitoring and displaying wind speed which activates an alarm upon the occurrence of a predetermined wind speed.

High winds associated with severe thunderstorms, tornadoes, and hurricanes frequently cause severe property damage, personal injury, or even death. It is well known that advance warning of dangerously high wind speeds is crucial to averting potentially disastrous outcomes. Residents are often caught unaware that a storm has grown to dangerous proportions such that it is time to secure personal property or relocate to a safe location within the home. In addition, power outages caused by a storm contribute to occupant unawareness regarding high winds since televisions or electric radios are no longer a source for weather updates.

Various devices for measuring wind speed, wind direction, barometric pressure, temperature, humidity, and other meteorological events are known in the art. Although assumably effective in operation, such devices are relatively complex, expensive, and therefore not well-suited for residential home use. Further, such devices do not provide wind speed data in a manner easily understood by laypersons.

It is therefore desirable to have a system for continuously monitoring wind speed at a particular residential location and which indicates the current wind speed and wind classification at a display unit within the home. It is also desirable to have a wind speed monitoring system which activates an audible alarm when a predetermined wind speed is detected. Further, it is desirable to have a system which is powered by batteries that are rechargeable by solar or wind generated power.

SUMMARY OF THE INVENTION

In response thereto I have invented a wind speed monitoring system which utilizes an anemometer for measuring wind speed. An inexpensive anemometer having three or four concave cups attached to a vertical shaft may be mounted atop the roof of a house. The concave surfaces of the cups provide greater wind resistance than their convex surfaces, causing them to catch the wind and efficiently rotate the shaft.

The number of rotations of the anemometer shaft is monitored by a photomicrosensor which delivers the data to a logic circuit at predefined time intervals. The logic circuit calculates the current wind speed based on the number of shaft revolutions per unit of time. Next, the logic circuit activates an appropriate light emitting diode (LED) on a display unit which indicates the present wind speed to a resident. The LEDs correspond to the Beufort Scale which descriptively classifies wind speeds ranging from calm to hurricane force winds. If the wind speed has reached a predetermined level, the logic circuit actuates an audible alarm housed within the display unit.

The anemometer shaft is also coupled to a dynamo. A dynamo is a rotating machine for converting mechanical energy to electrical energy. Electricity generated by the dynamo as well as energy collected by solar panels is delivered to a trickle circuit for storage. Energy stored in the trickle circuit is used to power rechargeable batteries as needed.

It is therefore a general object of this invention to provide a monitoring system having an anemometer for measuring wind speed at a particular residential location.

Another object of this invention is to provide a monitoring system having a display unit for indicating the present wind speed to residential occupants.

Still another object of this invention is to provide a monitoring system which activates an audible alarm upon detection of a wind speed greater than a level predetermined and set by a residential occupant.

A further object of this invention is to provide a monitoring system which is powered by rechargeable batteries.

A still further object of this invention is to provide a monitoring system having an array of solar panels and dynamo for recharging system batteries in response to the weather elements of the sun or wind acting thereon.

Yet another object of this invention is to provide a monitoring system which is simple and economical to manufacture.

Other objects and advantages of this invention will become apparent from the following description taken in connection with the accompanying drawings, wherein is set forth by way of illustration and example, embodiments of this invention.

DESCRIPTION OF THE PREFERRED EMBODIMENT

Figure 1:
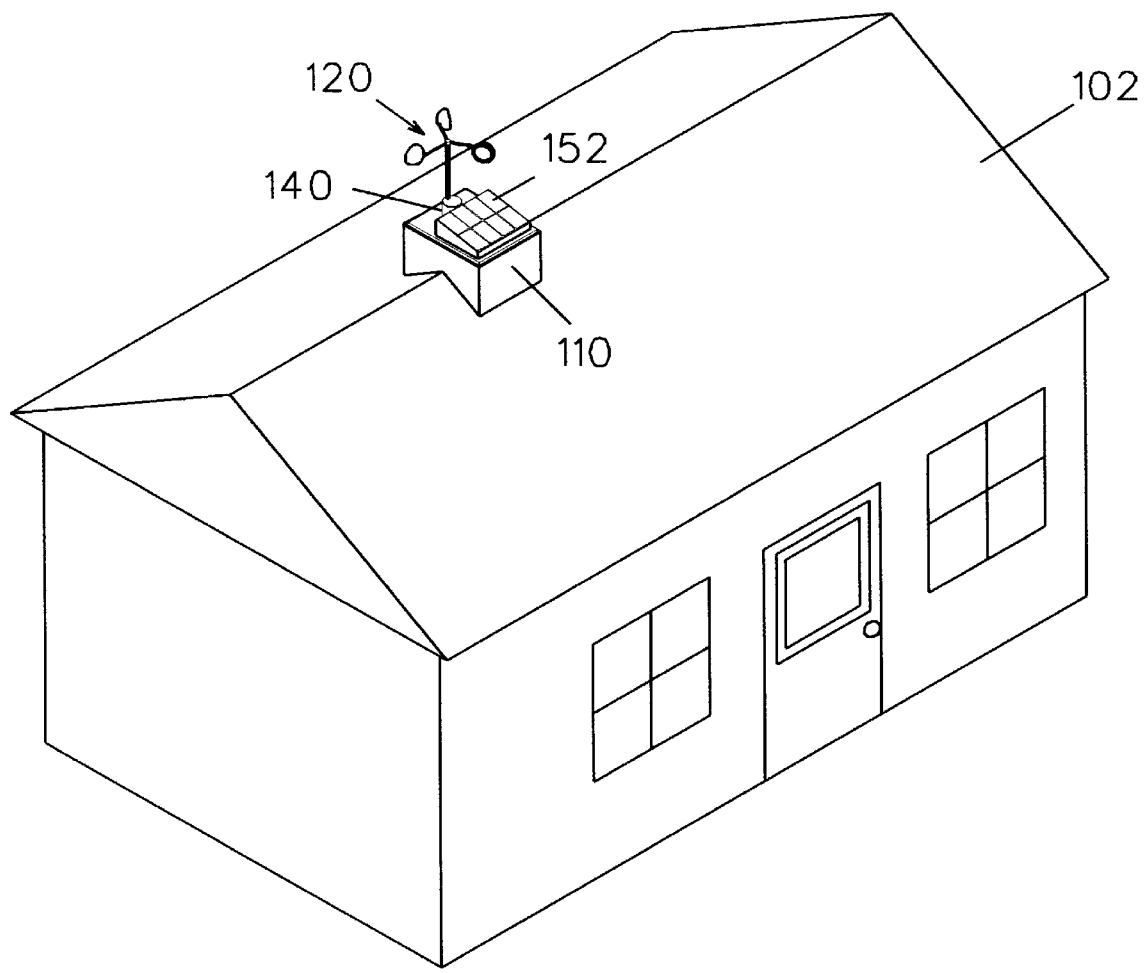
FIG. 1 is a perspective view of the monitoring system mounted atop the roof of a house.
Figure 2:
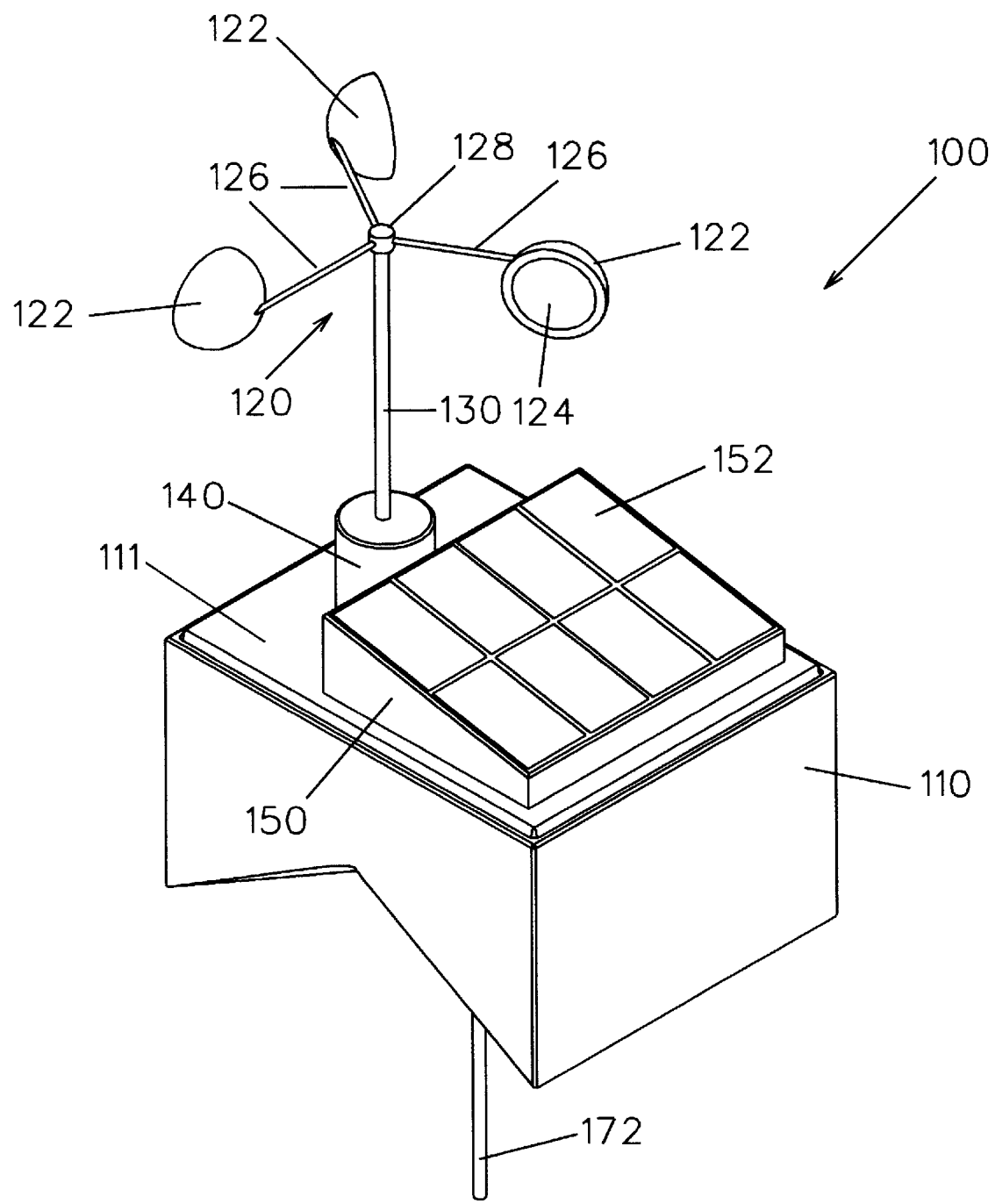
FIG. 2 is an isometric view, on an enlarged scale, of the monitoring system removed from the house.
Figure 3:
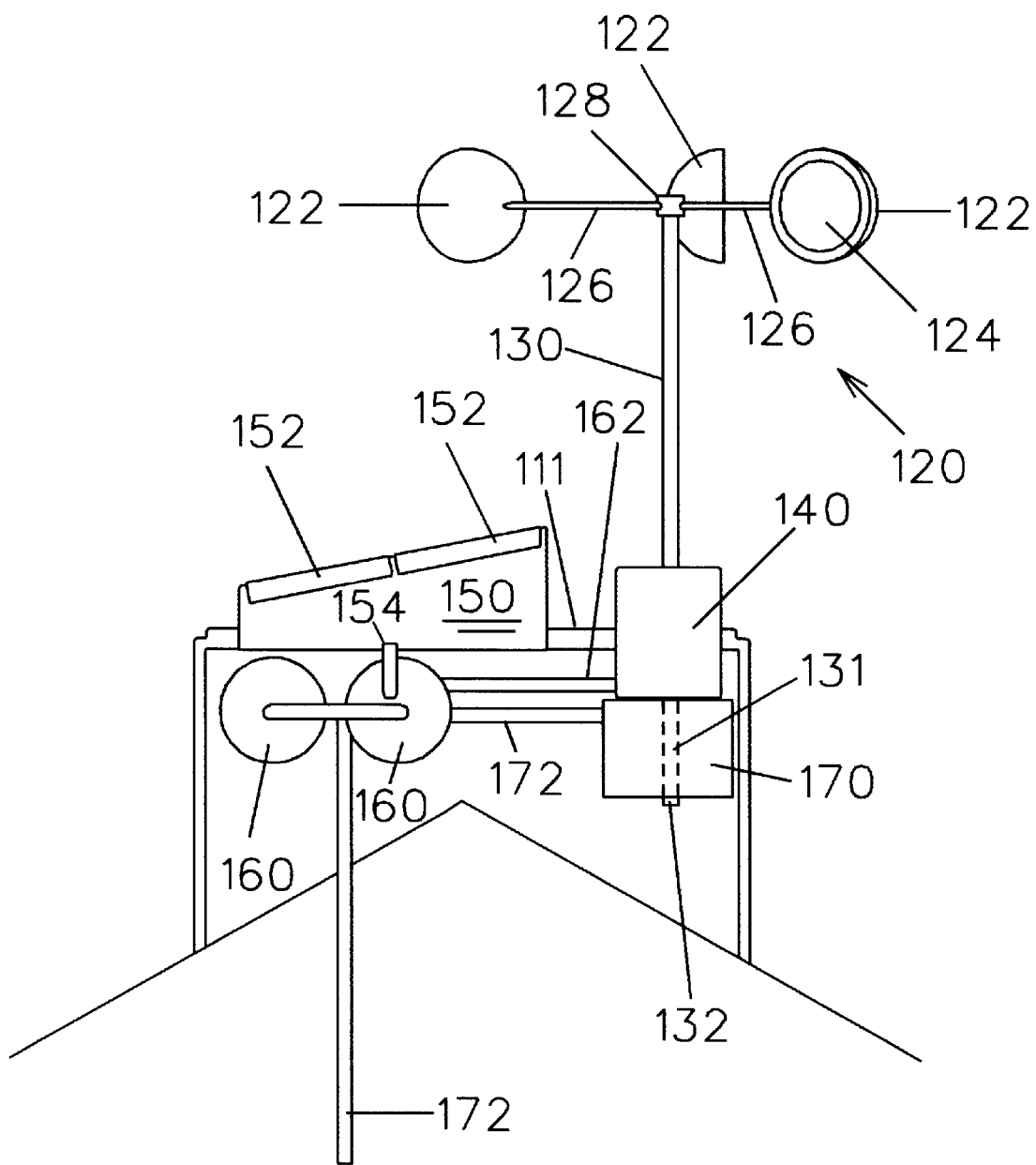
FIG. 3 is a right side view of the monitoring system shown in FIG. 2 with a portion removed to show the interior thereof.

Turning more particularly to the drawings, FIGS. 1–3 show a wind speed monitoring system 100 having a housing 110 fixedly attached to the roof 102 of a house or building for supporting and enclosing elements of the system. The monitoring system 100 includes a cup-type anemometer 120 which is known in the art. The anemometer 120 comprises three rigid hemispherical shells 122 having open inlet ends 124 for collecting wind within each shell 122. Each shell 122 is fixedly attached to a rod 126, each rod 126 being fixedly coupled to a common flange 128. The flange 128 is fixedly attached to the upper end of a vertical shaft 130. The inner concave surfaces presented by the open ends 124 of the shells 122 provide greater wind resistance than their exterior convex surfaces, causing the shells 122 and therefore the shaft 130 to rotate.

Figure 5:
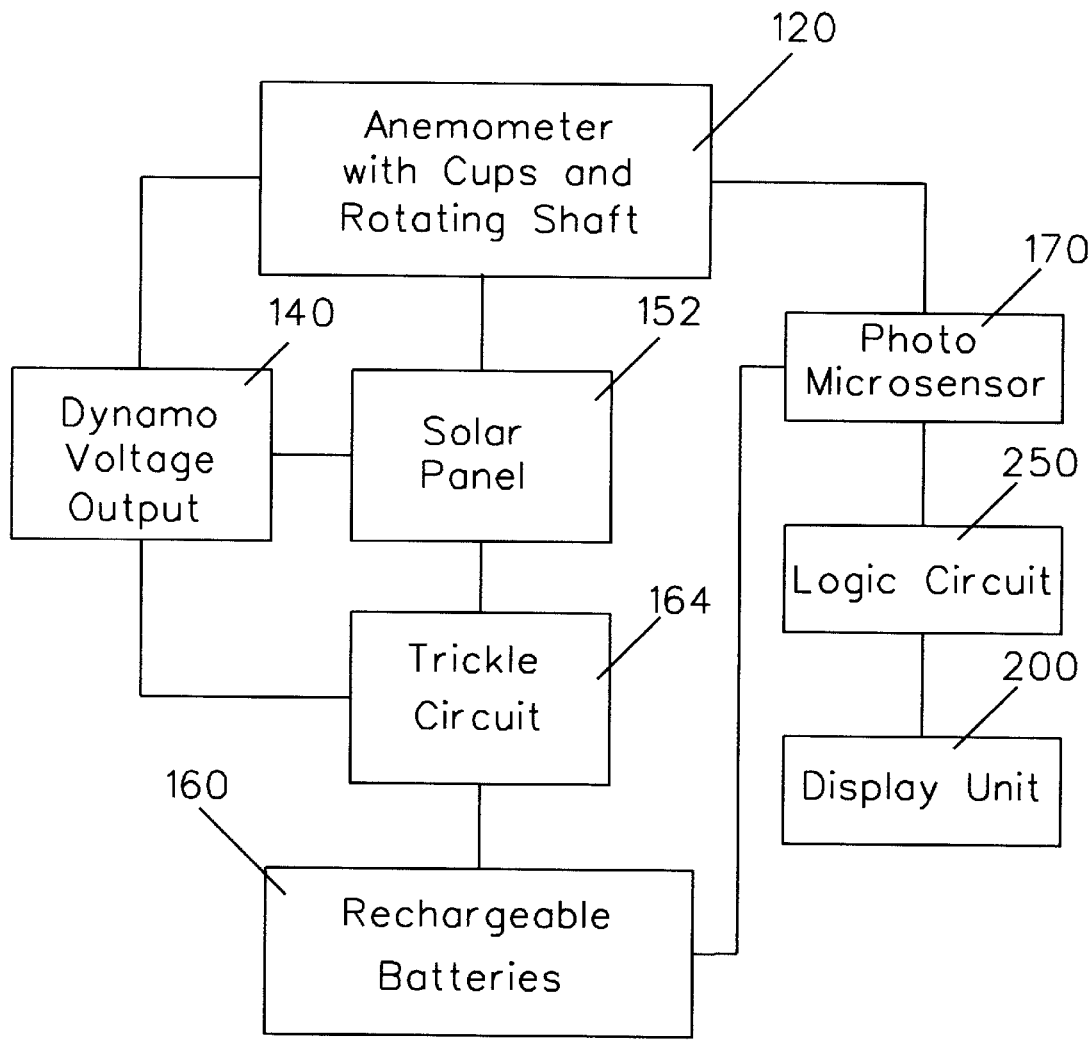
FIG. 5 is a block diagram of the monitoring system.

The vertical shaft 130 of the anemometer 120 is rotatably mounted to a dynamo 140 and extends therethrough to a photomicrosensor 170, the function of the photomicrosensor to be described later. The dynamo 140, the construction of which is known in the art, extends through an aperture in the top wall 111 of the housing 110 and is fixedly attached thereto. The dynamo 140 converts the mechanical energy derived from rotation of the shaft 130 into electricity. The voltage produced by the dynamo 140 is directly proportional to the rate of shaft rotation. Voltage generated by the dynamo 140 is delivered to rechargeable batteries 160 through insulated wire 162. It is understood that voltage generated by the dynamo 140 may be initially delivered to a trickle circuit 164 (FIG. 5) for temporary storage and then slowly delivered to the batteries 160 as needed. The batteries 160 provide power to the photomicrosensor 170, logic circuit 250, and display unit 200.

The monitoring system 100 further includes a housing 150 having an array of solar panels 152, said housing 150 being fixedly attached to the monitoring system housing 110. The solar panels 152 are fixedly attached to a top side of the solar array housing 150 which is slightly inclined to efficiently receive solar energy. Energy collected by the solar panels 152 is converted to electricity and delivered to the rechargeable batteries 160 through a wire 154, the electric charge being first stored in a trickle circuit 164 as described above.

Figure 4:
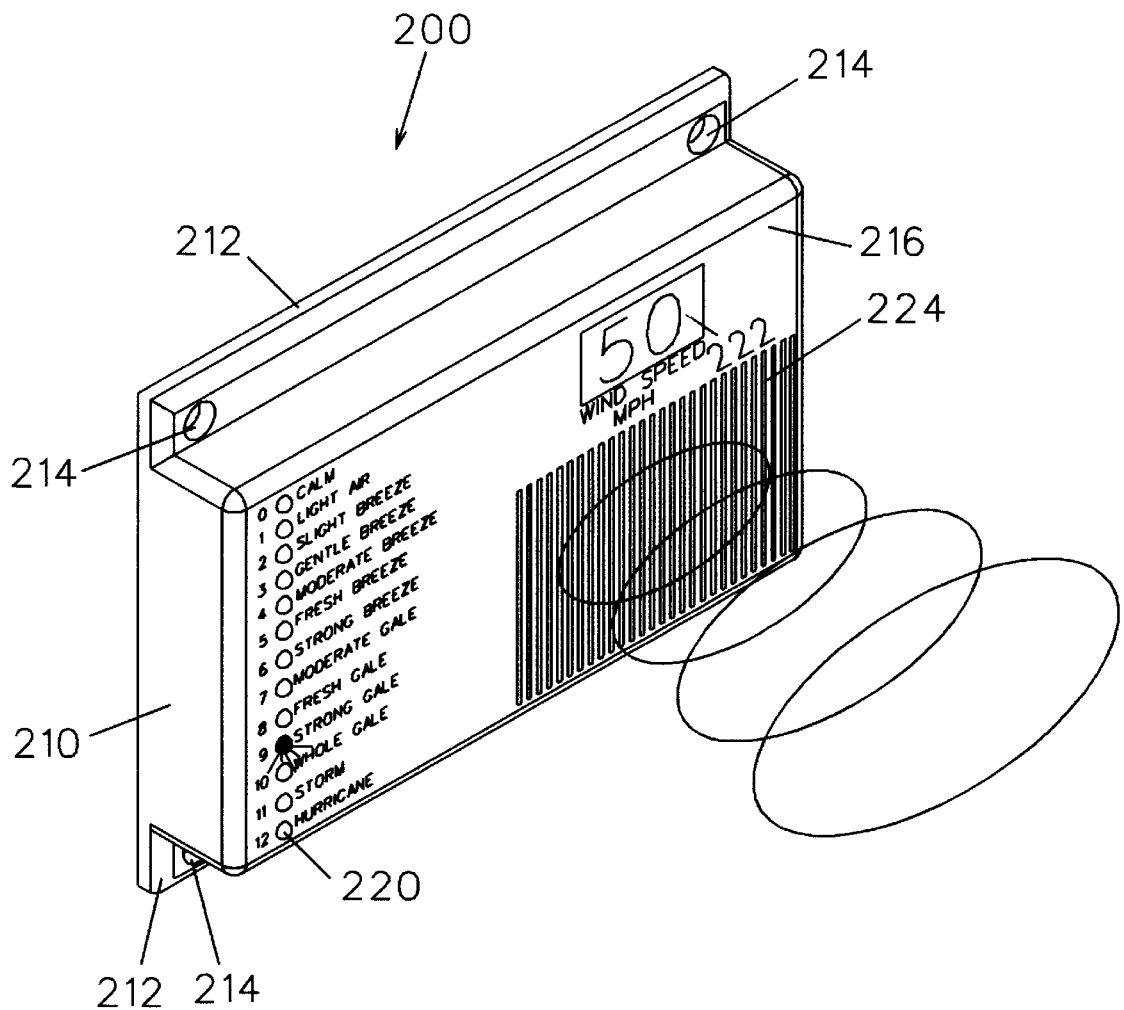
FIG. 4 is an isometric view of the display unit of the monitoring system.

As shown in FIG. 4, the monitoring system 100 further includes a display unit 200 having a housing 210 with a plurality of vertically spaced apart LED's 220 attached to a front wall 216 thereof, the LED's 220 corresponding to Beufort Scale classifications of wind speed. The display unit 200 further includes a liquid crystal display (LCD) screen 222 for displaying the present wind speed and an audible alarm 224 which is activated as described later. Oppositely disposed lip/flanges 212 are integrally attached to the display unit housing 210, said lip/flanges 212 having spaced apart apertures 214 for receiving mounting structures such as screws therethrough.

The anemometer shaft 130 includes a visible mark 131 displaced from the lower end 132 thereof that is detectable by the photomicrosensor 170 through which the shaft 130 extends as described earlier. Accordingly, the photomicrosensor 170 counts the number of revolutions of the shaft 130 and sends this data at predefined time intervals through a wire 172 to a logic circuit 250 (FIG. 5) housed within the display unit 200 (FIG. 4). The logic circuit 250 calculates the present wind speed based on the number of shaft revolutions detected within a fixed period of time as provided by an internal time counter.

Based on the wind speed calculation, the logic circuit 250 actuates an LED 220 on the display unit housing 210 corresponding to the appropriate Beufort Scale wind speed classification. The wind speed may also be digitally displayed in miles per hour on the display screen 222. The logic circuit 250 activates an audible alarm 224 within the display unit if the wind speed exceeds a predetermined wind speed set by the residential occupant.

Accordingly, it can be seen that the wind speed monitoring system provides continuous monitoring of wind speed at a residential location and displays the speed and Beufort Scale wind classification on a display unit within the home. This system also activates an audible alarm if the wind speed exceeds a user determined wind speed. The system is powered by batteries which are rechargeable by solar or wind-generated energy so as to be useful even during power outages.

It is to be understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A wind speed display system comprising:
   an anemometer assembly including a shaft rotating at a speed in proportion to a speed of wind acting thereon;
   a dynamo coupled to said shaft, said dynamo producing an electric power upon said shaft rotation;
   a solar power cell for providing electric power upon solar rays impinging thereon;
   a trickler circuit connected to said dynamo and solar cell for dispensing said electric power received therefrom;
   at least one rechargeable battery connected to said trickler circuit;
   a photomicrosensor for counting rotations of said shaft, said photomicrosensor producing data corresponding to said rotations;
   a logic circuit including a time counter therein for receiving said data from said photomicrosensor, said logic circuit utilizing said data for computing a wind speed corresponding to rotation of said shaft;
   means coupled to said battery and said logic circuit for displaying a wind speed, said display means including at least a screen for displaying the calculated wind speed.

2. The system as claimed in claim 1 further comprising a plurality of display indicia on said display means corresponding to predetermined gradients of wind speed.

3. The system as claimed in claim 2 wherein said indicia correspond to data of a Beufort scale.

4. The system as claimed in claim 1 further comprising means for producing an alarm coupled to said logic circuit, said alarm means energized upon a predetermined wind speed being calculated by said logic circuit.

5. A wind speed display system comprising:
   an anemometer assembly including means for responding to wind acting thereon, said responding means including an element acting at a speed in proportion to said wind speed;
   means coupled to said anemometer assembly for producing an electric power in proportion to said wind response means;
   a solar power cell for providing electrical power;
   means for regulating said electric power received from said solar cell and producing means;
   at least one rechargeable battery connected to said regulating means;
   means for delivering data corresponding to said speed of said element acting in said anemometer assembly;
   data processing means for receiving said data from said delivering means, said data processing means utilizing said data for computing a wind speed corresponding to said element speed;
   means coupled to said data processing means for displaying at least said computed wind speed.

6. The system as claimed in claim 5 further comprising a plurality of display indicia on said display means corresponding to predetermined gradients of wind speed.

7. The system as claimed in claim 6 wherein said indicia correspond to data of a Beufort scale.

8. The system as claimed in claim 5 further comprising means for producing an alarm coupled to said data processing means, said alarm producing means energized upon a predetermined wind speed being computed.

9. A wind speed display system comprising:
   an anemometer assembly including a shaft rotating at a speed in proportion to speed of wind acting thereon;
   means coupled to said assembly for producing electrical power upon at least one weather element acting thereon;
   a circuit for storing said electric power received from said producing means;

at least one rechargeable battery operably connected to said circuit;

means for determining a speed of rotation of said shaft, said determining means producing information corresponding to said shaft speed;

a logic circuit for receiving said information, said logic circuit including means for computing a wind speed corresponding to said information;

means coupled to said logic circuit for displaying at least said computed wind speed.

10. The system as claimed in claim 9 wherein said weather element is the sun, said producing means comprising a solar cell.

11. The system as claimed in claim 9 wherein said weather element is the wind, said producing means comprises a dynamo coupled to said shaft.

12. The system as claimed in claim 9 further comprising a plurality of display indicia on said display means corresponding to predetermined gradients of air speed.

13. The system as claimed in claim 12 wherein said indicia correspond to data on a Beufort scale.

14. The system as claimed in claim 9 further comprising means for producing an alarm coupled to said logic circuit, said alarm means energized upon a predetermined wind speed being calculated by said logic circuit.

* * * * *